United States Patent
Kang

(10) Patent No.: US 6,223,282 B1
(45) Date of Patent: Apr. 24, 2001

(54) CIRCUIT FOR CONTROLLING EXECUTION OF LOOP IN DIGITAL SIGNAL PROCESSING CHIP

(75) Inventor: Sang-ug Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/126,226

(22) Filed: Jul. 30, 1998

(30) Foreign Application Priority Data

Dec. 29, 1997 (KR) .................................................. 97-76387

(51) Int. Cl.⁷ .............................. G06F 15/00; G06F 7/38; G06F 9/00; G06F 9/44
(52) U.S. Cl. .......................... 712/241; 712/223; 712/241
(58) Field of Search ............................. 712/23, 200, 217, 712/219, 231, 233, 241, 1, 239, 235, 35, 223; 714/1; 708/520

(56) References Cited

U.S. PATENT DOCUMENTS

| | | | |
|---|---|---|---|
| 5,001,712 | * 3/1991 | Splett et al. | 714/703 |
| 5,473,557 | * 12/1995 | Harrison et al. | 706/520 |
| 5,727,194 | * 3/1998 | Shridhar et al. | 712/241 |
| 5,898,865 | * 4/1999 | Manalingaiah | 712/239 |
| 5,960,210 | * 9/1999 | Jin | 712/1 |
| 6,003,128 | * 12/1999 | Tran | 712/241 |
| 6,038,649 | * 3/2000 | Ozawa et al. | 712/217 |

FOREIGN PATENT DOCUMENTS

| | | |
|---|---|---|
| 53-143142 | 12/1978 | (JP) . |
| 55-49753 | 4/1980 | (JP) . |
| 56-68865 | 6/1981 | (JP) . |
| 58-127245 | 7/1983 | (JP) . |
| 60-198640 | 10/1985 | (JP) . |
| 2-306338 | 12/1990 | (JP) . |
| 3-53324 | 3/1991 | (JP) . |
| 3-201131 | 9/1991 | (JP) . |
| 4-333929 | 11/1992 | (JP) . |
| 6-161742 | 6/1994 | (JP) . |
| 6-242946 | 9/1994 | (JP) . |

* cited by examiner

Primary Examiner—Thomas Lee
Assistant Examiner—Chun Cao
(74) Attorney, Agent, or Firm—Staas & Halsey LLP

(57) ABSTRACT

A circuit for controlling execution of a loop in a digital signal processing chip. The circuit includes a least significant bit state detection unit to output an effective signal of a predetermined level according to the state of a least significant bit and the states of first and second signals, when every bit other than the least significant bit is zero as a result of detection of the state of each bit in a counter register to which the number of loop executions is loaded; a conditional clock output unit to receive a clock signal and the first and second signals and output the clock signal only when the first or second signal is effective; and an ending condition signal output unit to output the output signal of the least significant bit state detection unit when a signal output from the conditional clock output unit is effective. Therefore, the circuit can prevent an error from being generated when the number of loop executions is zero, reduce the execution time upon realization of an entire algorithm, and prevent waste of a program memory.

18 Claims, 3 Drawing Sheets

CIRCUIT FOR CONTROLLING EXECUTION OF LOOP IN DIGITAL SIGNAL PROCESSING CHIP

CROSS-REFERENCE TO RELATED APPLICATIONS

This application claims the benefit of Korean Application No. 97-76387, filed Dec. 29, 1997, in the Korean Patent Office, the disclosure of which is incorporated herein by reference.

BACKGROUND OF THE INVENTION

1. Field of the Invention

The present invention relates to a digital signal processing chip, and more particularly, to a circuit for controlling execution of a loop in a digital signal processing chip which can prevent an error from being generated when the number of loop executions is zero, shorten the execution time upon realization of an entire algorithm, and reduce waste of a program memory.

2. Description of the Related Art

A digital signal processing chip is used a lot in fields necessary for a large amount of arithmetic calculation, i.e., an audio codec, echo canceling, etc. In the algorithms of these fields, many portions use a loop. Here, there is a case when a loop is executed a fixed number of times, but in many cases, the loop is repeated a variable number of times. Most of the digital signal processing chips input the number of loop executions to a control register, and then a designated section is repeated by the input number. Also, when a loop is repeated the variable number of times, a case when zero is input as the number of loop executions frequently occurs. At this time, an existing digital signal processing chip executes a loop once, and then the value of the control register is arbitrarily changed, thus generating an error. That is, the conventional digital signal processing chip generates an error when the number of loop executions is zero, i.e., when zero is input to the control register in which the number of loop executions is input. To be more specific, when the number of loop executions is zero, a loop is executed once, and then the control register has a maximum of its value, thus generating an error. In order to prevent the generation of the errors, the conventional digital signal processing chip always must perform a routine for checking whether the number of loop executions is zero in the case that the loop is repeated a variable number of times.

SUMMARY OF THE INVENTION

To solve the above and other problems, it is an object of the present invention to provide a circuit for controlling execution of a loop in a digital signal processing chip, which can prevent an error from being generated when the number of loop executions is zero, shorten the execution time when an entire algorithm is realized, and prevent waste of a program memory.

Additional objects and advantages of the invention will be set forth in part in the description which follows and, in part, will be obvious from the description, or may be learned by practice of the invention.

Accordingly, to achieve the above and other objects of the present invention, there is provided a circuit for controlling execution of a loop in a digital signal processing chip, including a least significant bit state detection unit to output an effective signal of a predetermined level according to the state of a least significant bit and the states of first and second signals, when every bit other than the least significant bit is zero as a result of detection of the state of each bit in a counter register to which the number of loop executions is loaded; a conditional clock output unit to receive a clock signal and the first and second signals and output the clock signal only when the first or second signal is effective; and an ending condition signal output unit to output the output signal of the least significant bit state detection unit when a signal output from the conditional clock output unit is effective.

It is preferable that the first signal is a loop ending signal which becomes effective when loop ending conditions are satisfied, and the second signal is a comparator loading signal which becomes effective when a final command address of the loop and an address for the command to be performed next are loaded to a loop comparator.

Preferably, the least significant bit state detection bit includes a plurality of PMOS gates connected to each other in series, wherein each gate is connected to the output ports of the remaining bits except for the least significant bit in the counter register, respectively; a first AND gate to perform an AND operation on the output of the output port of the least significant bit in the counter register and the comparator loading signal; a second AND gate to perform an AND operation on the output of the output port of the least significant bit in the counter register and the loop ending signal; an OR gate to perform an OR operation on the outputs of the first and second AND gates; and a PMOS gate connected to the plurality of PMOS gates in series, to receive the output of the OR gate and output the effective signal having a predetermined level.

It is preferable that the conditional clock output unit includes a first AND gate to perform an AND operation on the clock signal and the comparator loading signal; a second AND gate to perform an AND operation on the clock signal and the loop ending signal; and an OR gate to perform an OR operation on the outputs of the first and second AND gates.

Preferably, the ending condition signal output unit is an AND gate to perform an AND operation on the output signal of the conditional clock output unit and the output signal of the least significant bit state detection unit.

BRIEF DESCRIPTION OF THE DRAWINGS

The above and other objects and advantages of the present invention will become more apparent by describing in detail a preferred embodiment thereof with reference to the attached drawings which.

DESCRIPTION OF THE PREFERRED EMBODIMENTS

Figure 1:
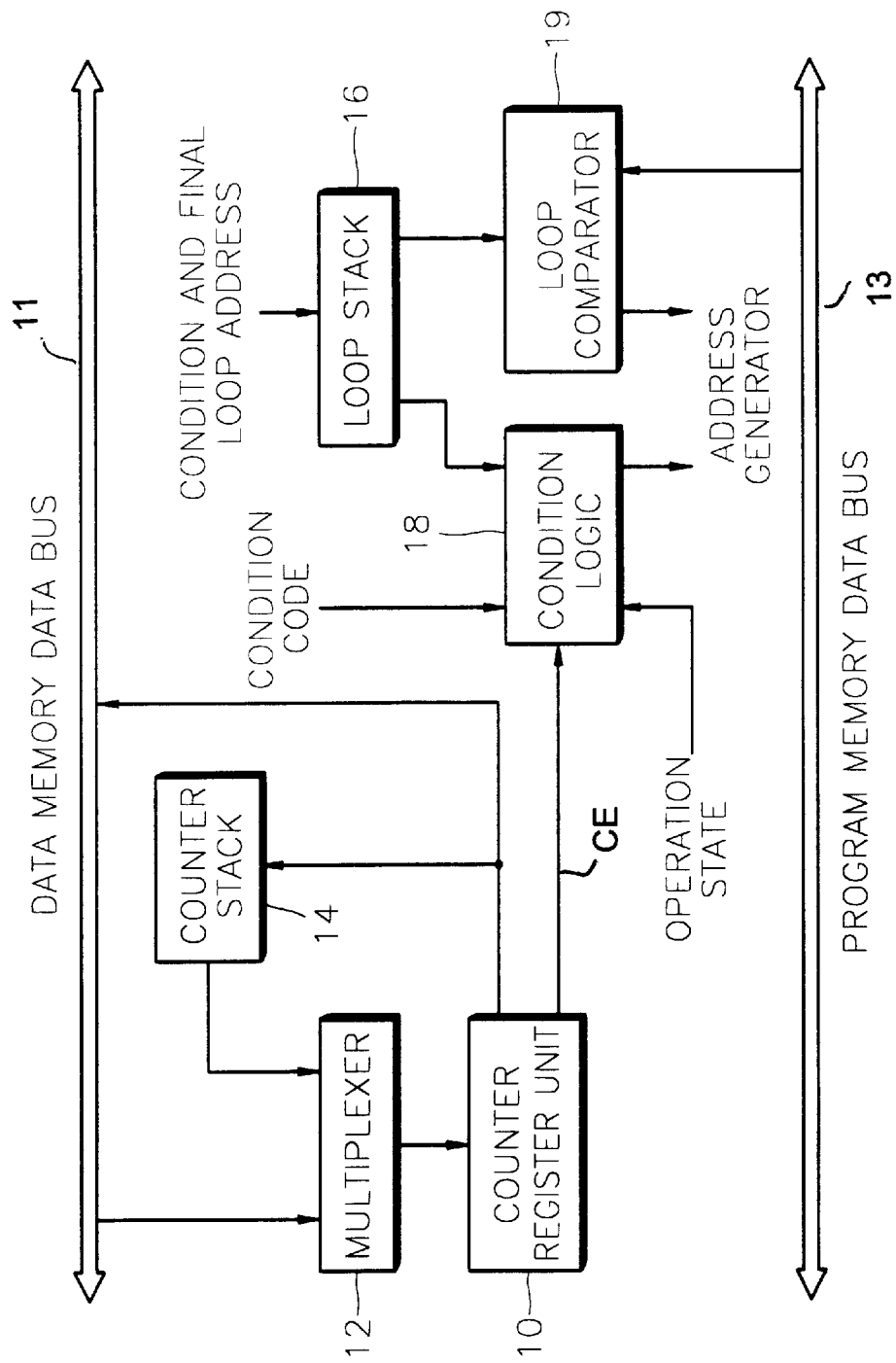
FIG. 1 a block diagram illustrating a circuit to control the sequence of performance of a program, which adopts a circuit to control execution of a loop in a digital signal processing chip according to an embodiment of the present invention.

Reference will now made in detail to the present preferred embodiments of the present invention, examples of which are illustrated in the accompanying drawings, wherein like reference numerals refer to the like elements throughout.

The embodiments are described below in order to explain the present invention by referring to the figures.

In a circuit for controlling the sequence of performance of a program shown in FIG. 1, a data memory data bus 11 is a path along which a variety of data passes. A program memory data bus 13 is a path along which data of a program memory passes. A counter register unit 10 includes a counter register where the number of loop executions is loaded and a loop execution control circuit, according to an embodiment of the present invention, and outputs an ending condition signal CE. A counter stack 14 is a register which stores the value of the counter register of the counter register unit 10 in case of need. A multiplexer 12 multiplexes the output of the counter stack 14 and data of the data memory data bus 11 and provides the multiplexed output to the counter register unit 10. A loop stack 16 is a register which stores an address having a final execution command, and the ending conditions of a temporarily-halted loop. A loop comparator 19 compares the address having the final execution command of the loop stored in the loop stack 16 in every clock with a subsequent address generated by a program sequencer (not shown). A condition logic 18 considers the ending condition signal CE output from the counter register unit 10 and an operation state, and has an influence on an address generator. According to the state of the ending conditional signal CE, the condition logic 18 outputs a control signal to the address generator which generates the address of a next command to be executed in order to change the address of the next command to be executed. The loop execution is ended when the ending conditional signal CE is effective.

Figure 2:
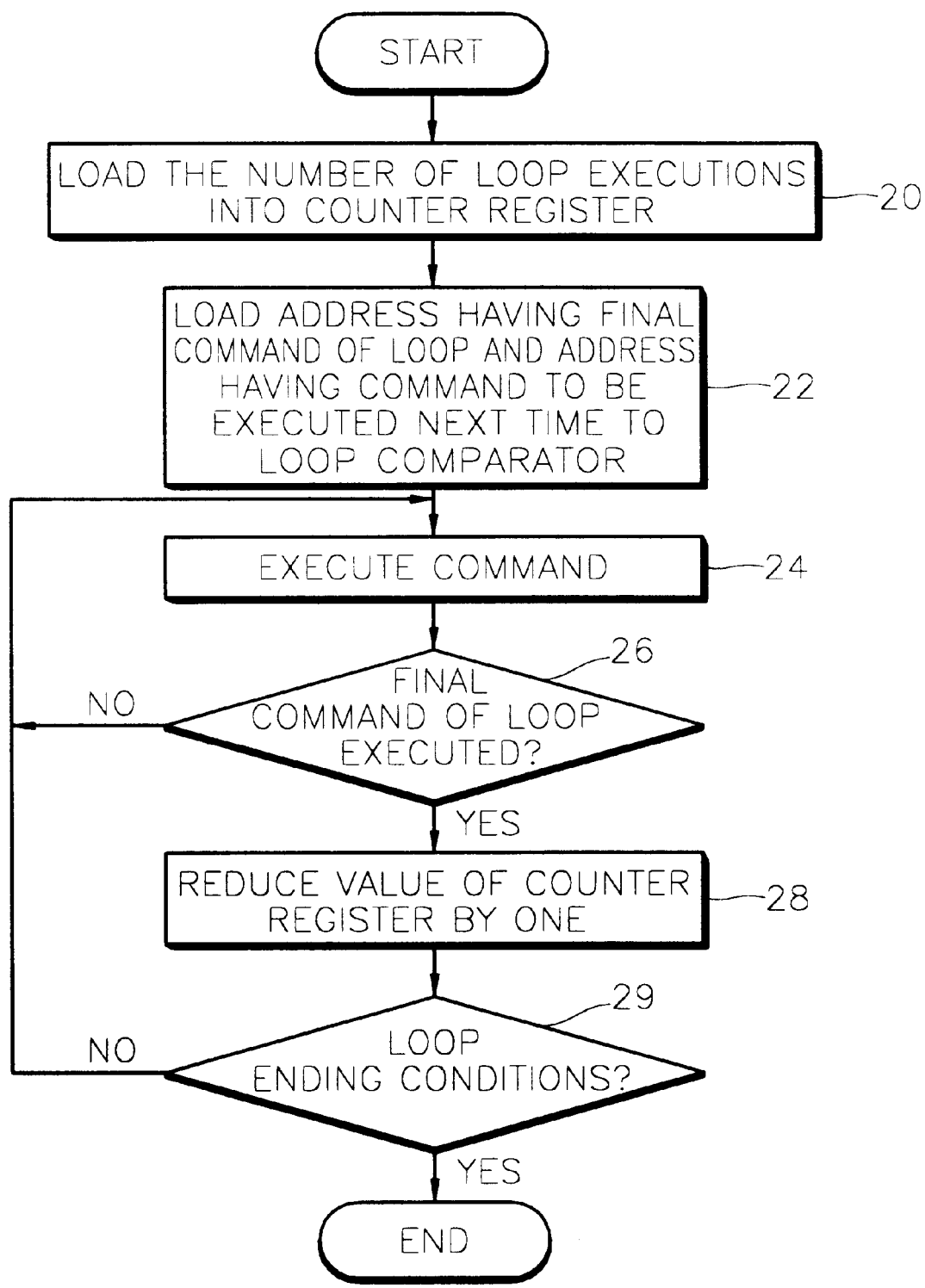
FIG. 2 is a flowchart illustrating a general process in which a loop is performed according to the embodiment of the present invention.

FIG. 2 is a flowchart illustrating a process through which a loop is executed in the program performance sequence control circuit shown in FIG. 1. The process where the loop is executed will be now be described referring to FIG. 2.

Assume that after an arbitrary command is performed before starting the present process, and a loop is executed, every value necessary for performing a next command is stored in a stack which includes a stack related to the execution of a next command as well as the loop stack 16.

Figure 3:
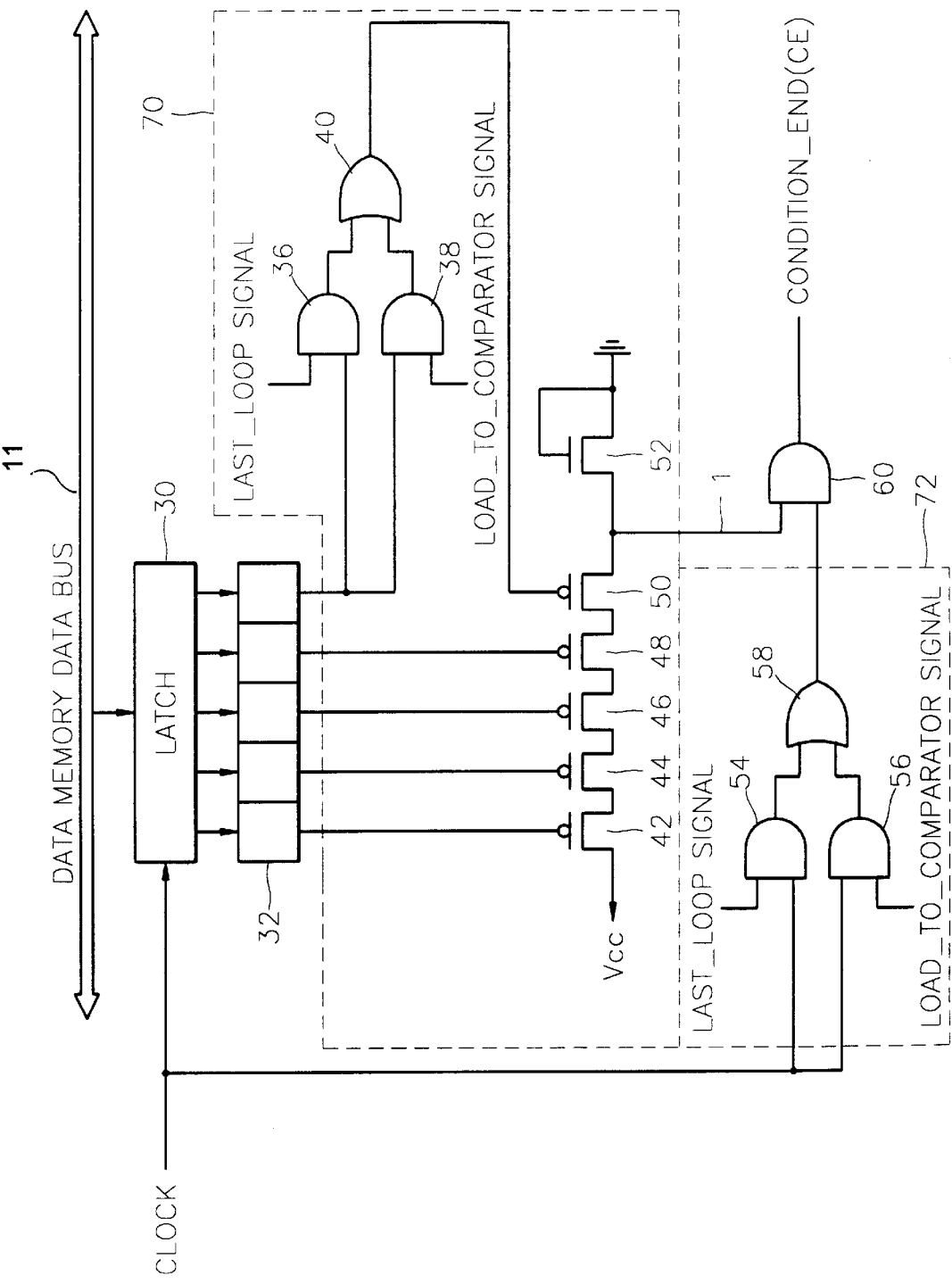
FIG. 3 is a view illustrating a circuit to control execution of a loop in a digital signal processing chip according to the embodiment of the present invention.

In step 20, a desired repetition frequency N is loaded in the counter register of the counter register unit 10, before an actual loop is executed. Here, N is the number of loop executions. In step 22, an address having a final command stored in the loop stack 16 and an address for a command to be performed the next time are loaded in the loop comparator 19. FIG. 3 shows the loop execution control circuit according to the embodiment of the present invention which automatically detects whether the value of the counter register is zero, in step 22. In step 24, a command of a designated address is executed, and in step 26, it is detected whether the final command of a loop has been executed. If it is determined in step 26 that the final command has not been executed, the procedure is fed back to the step 24 to continue the command execution. If it is determined in step 26 that the final command has been executed, the value of the counter register is reduced one by one, in step 28. In step 29, a detection of whether the value of the counter register is zero is made, and when It the result of the detection is zero, the loop is ended, otherwise, the procedure is fed back to step 24 to execute a first command of the loop.

The loop execution control circuit in a digital signal processing chip according to the embodiment of the present invention shown in FIG. 3 includes a least significant bit state detection unit 70, a conditional clock output unit 72 and an ending condition signal output unit 60. The least signal bit state detection unit 70 outputs an effective signal having a predetermined level, according to the state of a least significant bit of a counter register 32 and the states of a loop ending signal LAST_LOOP SIGNAL and a comparator loading signal LOAD_TO_COMPARATOR SIGNAL, when each bit other than the least significant bit is zero as a result of detection of the state of each bit in a counter register 32, in which the number of loop executions is loaded, from the data memory data bus 11 via a latch 30. The conditional clock output unit 72 receives a clock signal, the loop ending signal LAST_LOOP SIGNAL, and the comparator loading signal LOAD_TO_COMPARATOR SIGNAL, and outputs the clock signal only when the loop ending signal LAST_LOOP SIGNAL or the comparator loading signal LOAD_TO_COMPARATOR is effective. The ending condition signal output unit 60 is an AND gate which outputs the output signal of the least significant bit state detection unit 70 when an output signal of the conditional clock output unit 72 is effective.

The loop ending signal LAST_LOOP SIGNAL becomes one only when the loop ending conditions are satisfied in step 29 of FIG. 2. The comparator loading signal LOAD_TO_COMPARATOR SIGNAL becomes one only when the address of a final command of a loop and the address of a command to be executed the next time are loaded to the loop comparator in step 22 of FIG. 2.

The least significant bit state detection unit 70 includes a plurality of PMOS gates 42, 44, 46 and 48, a first AND gate 38, a second AND gate 36, a first OR gate 40 and a PMOS gate 50. The plurality of PMOS gates 42, 44, 46 and 48 are connected to the output ports of bits other than the least significant bit of the counter register 32, respectively, and connected to each other in series. The first AND gate 38 performs an AND operation on the output of the output port of the least significant bit in the counter register 32 and the comparator loading signal LOAD_TO_COMPARATOR SIGNAL. The second AND gate 36 performs an AND operation on the output of the output port of the least significant bit in the counter register 32 and the loop ending signal LAST_LOOP SIGNAL. The first OR gate 40 performs an OR operation on the outputs of the first and second AND gates 38 and 36. The PMOS gate 50 is connected to the PMOS gate 48 in series, and receives the output of the first OR gate 40 and outputs an effective signal having a predetermined level to the ending condition signal output unit 60. An NMOS gate 52 in which a gate and a source are connected is connected between the PMOS gate 50 and a ground. Here, the NMOS gate 52 is always in an off state, but when an overvoltage is applied to a drain thereof, the NMOS gate 52 allows an overvoltage to flow into the ground.

Also, the conditional clock output unit 72 includes a third AND gate 56 for performing an AND operation on the clock signal and the comparator loading signal LOAD_TO_COMPARATOR SIGNAL, a fourth AND gate 54 for performing an AND operation on the clock signal and the loop ending signal LAST_LOOP SIGNAL, and a second OR gate 58 for performing an OR operation on the outputs of the third and fourth AND gates 56 and 54.

The loop execution control circuit in the digital signal processing chip according to the embodiment of the present invention having such a configuration does not execute a loop, generates no error, and executes a next command normally, when the value of the counter register 32 is zero. When the value of the counter register 32 is N (N is an integer that is equal to or more than 1), the circuit generates an ending condition signal CONDITION_END (CE) for helping the loop be executed N times.

In order to explain the operation of the circuit shown in FIG. 3, we will assume that the states of all elements and signals are the states when step 20 of FIG. 2 is performed. When a clock is generated, the number of loop executions is loaded into the counter register 32 from the data memory data bus 11 via the latch 30. In the present embodiment, assume that the number of bits in the counter register 32 is five. Next, assume that the value input to the counter register 32 is a positive number other than zero, i.e., N. If any of the four bits other than the least significant bit in the counter register 32 is one, one of the PMOS transistors 42, 44, 46 and 48 enters an OFF state, and thus a line 1 becomes zero. Accordingly, the ending condition signal CONDITION_END becomes zero regardless of any other signals. Thus, when the value of the counter register 32 is not zero or one, the ending condition signal CONDITION_END becomes zero.

When the value of the counter register 32 of FIG. 2 is one, a command is executed in step 24, and then the value thereof is changed from one to zero in step 28, and the loop ending signal LAST_LOOP SIGNAL becomes one. Therefore, the output of the second AND gate 36 is zero. Also, since the comparator loading signal LOAD_TO_COMPARATOR SIGNAL is zero, the output of the first OR gate 40 becomes zero. The PMOS transistor 50 is turned ON, and thus the line 1 becomes one. When the state of the clock is one, the fourth AND gate 54 also outputs one, and thus the second OR gate 58 outputs one. Finally, the ending condition signal CONDITION_END (CE) becomes one. Accordingly, such an ending condition signal CONDITION_END (CE) is input to the condition logic 18 of FIG. 1 as a command for ending the loop. Then, a next command is executed.

Meanwhile, if zero is input to the counter register 32 in step 20, the comparator loading signal LOAD_TO_COMPARATOR SIGNAL becomes one in step 22, the first AND gate 38 outputs zero, and the first OR gate 40 outputs zero. Accordingly, the PMOS transistor 50 is turned ON, and thus the line 1 becomes one. Also, when the state of the clock is one, the third AND gate 56 outputs one, and the second OR gate 58 outputs one. Finally, the ending condition signal CONDITION_END (CE) becomes one. Accordingly, such an ending condition signal CONDITION_END (CE) is input to the condition logic 18 of FIG. 1 as a command for ending the loop. Then, a next command is executed without execution of the loop. Thus, in the case when the number of loop executions is zero, after step 22 in FIG. 2, the loop execution is ended without generating any errors and the next command is executed.

As described above, the loop execution control circuit in a digital signal processing chip according to the present invention can prevent an error from being generated when the number of loop executions is zero, reduce the execution time upon realization of an entire algorithm, and prevent waste of a program memory.

What is claimed is:

1. A circuit for controlling execution of a loop in a digital signal processing chip, wherein a counter register stores a number of loop executions of the loop to be executed, the circuit comprising:
   a least significant bit state detection unit to output an effective signal of a predetermined level according to a state of a least significant bit of the counter register and a state of a first or second signal, wherein said least significant bit state detection unit
      detects the state of each bit in the counter register to which the number of loop executions is loaded, and outputs the effective signal according to the state of the first or second signal when every bit other than the least significant bit is zero as a result of detecting the state of each bit in the counter register to which the number of loop executions is loaded;
   a conditional clock output unit to
      receive a clock signal and the first and second signals, and
      output the clock signal when the first or second signal is effective; and
   an ending condition signal output unit to output the effective signal from said least significant bit state detection unit when the clock signal output from said conditional clock output unit is effective.

2. The circuit for controlling execution of a loop in a digital signal processing chip as claimed in claim 1, further comprising a loop comparator, wherein the first signal is a loop ending signal which becomes effective when loop ending conditions of the loop are satisfied, and the second signal is a comparator loading signal which becomes effective when a final command address of the loop and an address for a command to be performed next are loaded to the loop comparator.

3. The circuit for controlling execution of a loop in a digital signal processing chip as claimed in claim 2, wherein the least significant bit state detection unit comprises:
   a plurality of PMOS gates connected to each other in series, wherein the plurality of PMOS gates is connected to output ports of the remaining bits except for the least significant bit in the counter register, respectively;
   a first AND gate to perform an AND operation on an output of an output port of the least significant bit in the counter register and the comparator loading signal, to generate a first signal;
   a second AND gate to perform an AND operation on the output of the output port of the least significant bit in the counter register and the loop ending signal, to generate a second signal;
   an OR gate for performing an OR operation on the first and second signals, to generate a third signal; and
   a PMOS gate connected to the plurality of PMOS gates in series, to output the effective signal having the predetermined level in accordance with the third signal.

4. The circuit for controlling execution of a loop in a digital signal processing chip as claimed in claim 2, wherein the conditional clock output unit comprises:
   a first AND gate to perform an AND operation on the clock signal and the comparator loading signal, to generate a first signal;
   a second AND gate to perform an AND operation on the clock signal and the loop ending signal, to generate a second signal; and
   an OR gate to perform an OR operation on the first and second signals, to generate the clock signal and output the clock signal to the ending condition signal output unit.

5. The circuit for controlling execution of a loop in a digital signal processing chip as claimed in claim 2, wherein the ending condition signal output unit comprises an AND gate to perform an AND operation on the clock signal of the conditional clock output unit and the effective signal of the least significant bit state detection unit.

6. The circuit as claimed in claim 1, further comprising:
   a loop stack to store an address having a final execution command of the loop;
   a loop comparator to compare the address having the final execution command of the loop in every clock of the clock signal with a subsequent address, to generate and output a comparison signal to an address generator; and a condition logic to affect the address generator based upon the effective signal output from the ending condition signal output unit and the address having the final execution command.

7. The circuit as claimed in claim 6, further comprising:

a counter stack to store a value of the number of loop executions stored in the counter register;

a data bus to carry data; and a multiplexer to multiplex the data from the data bus and the stored value from the counter stack, to generate and output a multiplexed signal to the counter register.

8. The circuit as claimed in claim 6, further comprising:

a counter stack to store a value of the number of loop executions stored in the counter register;

a data bus to carry data; and a multiplexer to multiplex the data from the data bus and the stored value from the counter stack, to generate and output a multiplexed signal to the counter register.

9. The circuit as claimed in claim 3, further comprising an NMOS gate connected to the PMOS gate in series, having a gate and a source connected to a fixed potential, and a gate.

10. A circuit for controlling execution of a loop in a digital signal processing chip having a counter register with bits to store a number of loop executions of the loop to be executed and an address circuit which influences an address generator, the circuit receiving first, second, and clock signals, the circuit comprising:

a least significant bit state detection unit to
determine a state of each bit of the counter register, and output a detection signal of a first state in accordance with a state of a least significant bit of the bits and the first or second signals when each bit other than the least significant bit is zero; and a conditional output unit to selectively enable transmission of the detection signal of the first state as a condition end signal in accordance with the clock and first or second signals, to output a condition end signal to the address circuit to generate an address of a next command to be executed.

11. The circuit as claimed in claim 10, wherein said conditional output unit comprises:

a conditional clock output unit to enable transmission of the clock signal as a conditional clock signal when either of said first and second signals have a corresponding first state; and an ending condition signal output unit to enable transmission of the detection signal of the first state as the condition end signal to the address circuit when the conditional clock signal has a first state.

12. The circuit as claimed in claim 11, wherein the first signal is a loop ending signal which has the first state when loop ending conditions of the loop are satisfied, and the second signal is a comparator loading signal which has the first state when a final command address of the loop and an address for a command to be performed next are loaded to a loop comparator.

13. The circuit as claimed in claim 12, wherein said least significant bit state detection circuit comprises:

a plurality of transistors having a same conductivity connected to each other in series, wherein the plurality of transistors are respectively connected to output ports of the bits except for the least significant bit in the counter register;

a first AND gate to perform an AND operation on an output of an output port of the least significant bit and the comparator loading signal, to generate a first signal;

a second AND gate to perform an AND operation on the output of the output port of the least significant bit and the loop ending signal, to generate a second signal;

an OR gate to perform an OR operation on the first and second signals, to generate a third signal; and a transistor having the same conductivity as the plurality of transistors and connected to the plurality of transistors in series, to enable transmission of the detection signal of the first state when the third signal has a first state.

14. The circuit as claimed in claim 13, wherein said conditional clock output unit comprises:

a third AND gate to perform an AND operation on the clock signal and the comparator loading signal, to generate a fourth signal;

a fourth AND gate to perform an AND operation on the clock signal and the loop ending signal, to generate a fifth signal; and a second OR gate to perform an OR operation on the fourth and fifth signals, to generate the conditional clock signal.

15. The circuit as claimed in claim 14, wherein said ending condition signal output unit comprises an AND gate to perform an AND operation on the conditional clock signal and the detection signal, to generate the condition end signal.

16. The circuit as claimed in claim 12, wherein said conditional clock output unit comprises:

a first AND gate to perform an AND operation on the clock signal and the comparator loading signal, to generate a first signal;

a second AND gate to perform an AND operation on the clock signal and the loop ending signal, to generate a second signal; and a second OR gate to perform an OR operation on the first and second signals, to generate the conditional clock signal.

17. The circuit as claimed in claim 12, wherein said ending condition signal output unit comprises an AND gate to perform an AND operation on the conditional clock signal and the detection signal, to generate the condition end signal.

18. The circuit as claimed in claim 12, further comprising:

a loop stack to store an address having a final execution command of the loop;

wherein the loop comparator compares the address having the final execution command of the loop in every clock of the clock signal with a subsequent address, to generate and output a comparison signal to an address generator, and the address circuit is a condition logic to generate the address of the next command based upon the condition end signal and the address having the final execution command.

* * * * *